UNITED STATES PATENT OFFICE.

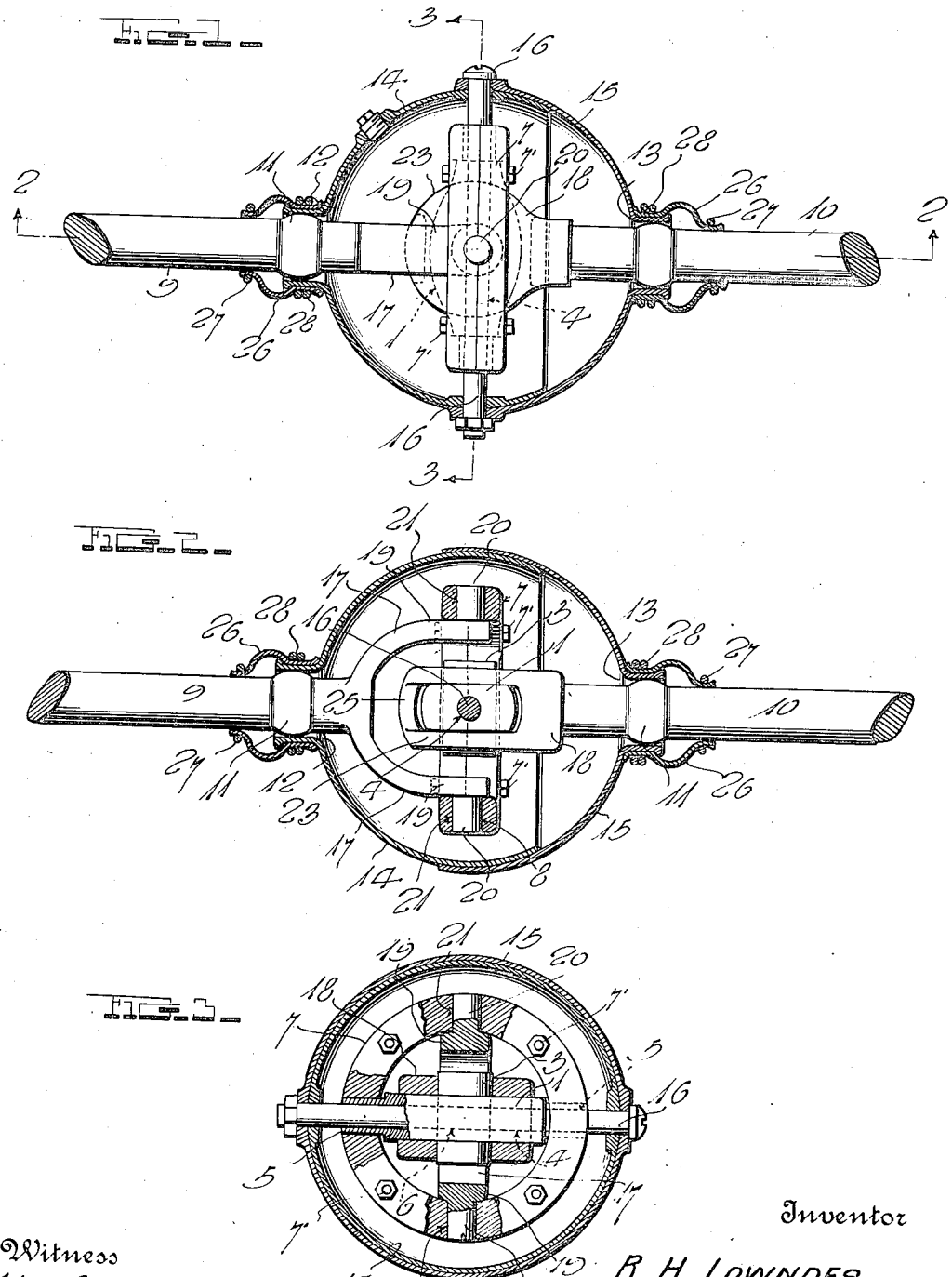

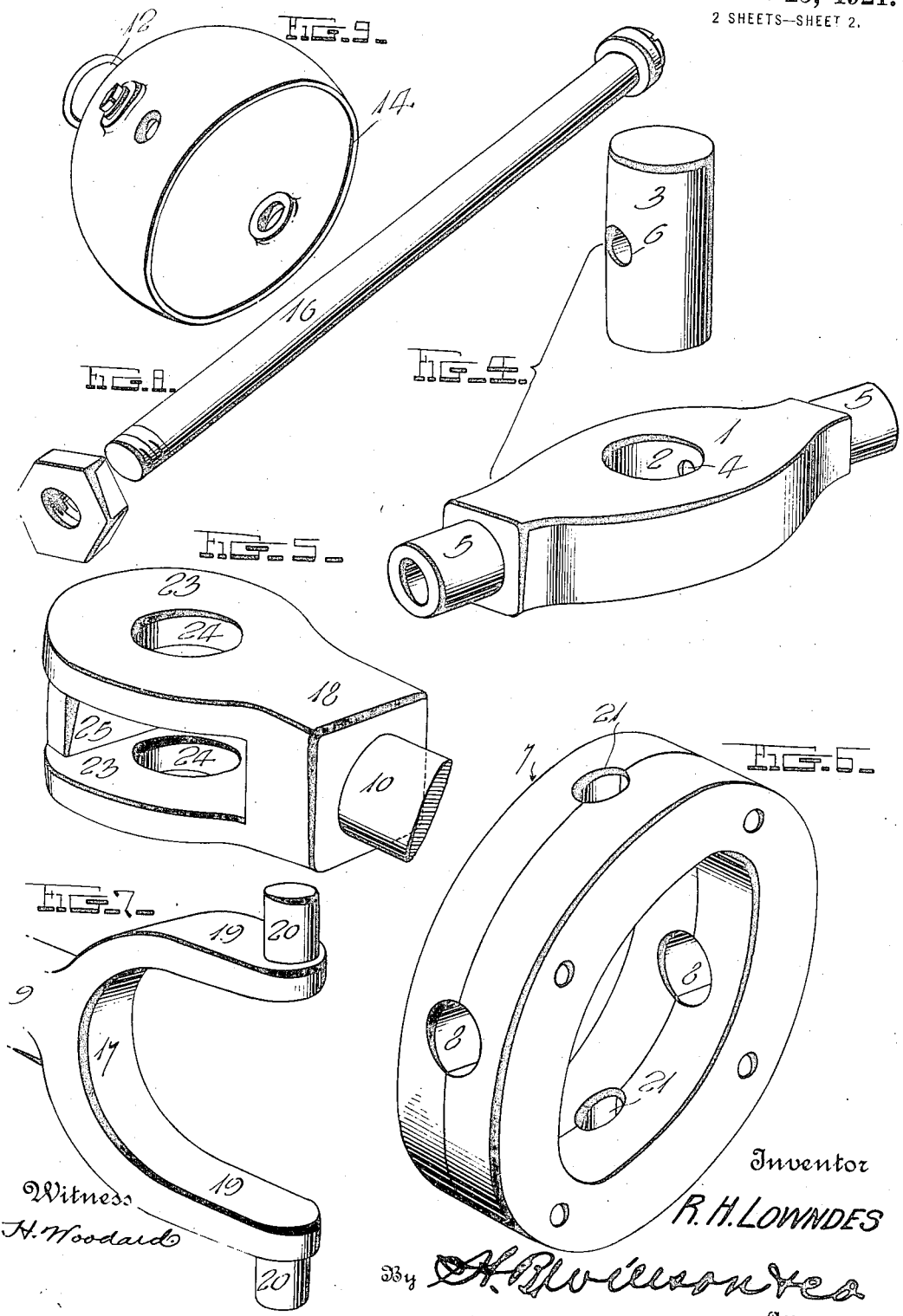

RICHARD H. LOWNDES, OF ATLANTA, GEORGIA.

UNIVERSAL JOINT.

1,394,749.  Specification of Letters Patent.  Patented Oct. 25, 1921.

Application filed December 20, 1920. Serial No. 431,952.

*To all whom it may concern:*

Be it known that I, RICHARD H. LOWNDES, a citizen of the United States, residing at Atlanta, in the county of Fulton and State of Georgia, have invented certain new and useful Improvements in Universal Joints; and I do declare the following to be a full, clear, and exact description of the invention, such as will enable others skilled in the art to which it appertains to make and use the same.

This invention relates to an improved universal joint. The object of the invention is to provide a joint that will enable one shaft to drive another when the two do not remain in line, and at the same time maintain a constant angular velocity ratio between the driving and the driven shafts; in other words, to provide a flexible shaft coupling without interfering with the constancy of the angular velocity ratio. The invention is merely an improvement on a universal joint already invented by me on which I was granted Letters Patent on April 15, 1913, in a patent issued under Number 1,058,878. The underlying principles being the same here as there.

The joint consists of a yoke bar and ring pivotally engaged by heads at the inner end of the shaft members, and of guides to maintain the proper juxtaposition of the parts. The whole principle of the transmission of a constant velocity ratio depends upon keeping the parts in proper relation, and with a view to insuring a constant velocity ratio between the driving shaft and the driven shaft, the plane through the center line of guide pin 16 (Fig. 8 of drawings) perpendicular to the plane of the shafts must always bisect the angle of the shafts. The provision of means for accomplishing this result is of vital importance to the proper operation of the invention and the accomplishment of the primary object of the invention. This result may be accomplished by various means and it will be understood that I do not limit myself to any particular means by which said result may be accomplished.

Another object of the invention is to so construct the guides that they form a casing to retain lubricating grease, and also act as an inclosing case to protect the whole from possible injury.

Another object of the invention is to provide a joint which will be comparatively simple in construction, and which may be easily and quickly put together or taken apart, and which will be securely held in a set up position when in use, and protected from injury and from grit and always well lubricated.

This invention is illustrated in the accompanying drawings, wherein:—

Figure 1 is a view showing the universal joint principally in elevation, the guide cups being shown in section.

Fig. 2 is a longitudinal section, taken along the line 2—2 of Fig. 1.

Fig. 3 is a transverse section taken along the line 3—3 of Fig. 1.

Fig. 4 is a perspective view of the yoke bar, and pivot pin which passes transversely through the yoke bar.

Fig. 5 is a perspective view of the socket or fork member at the inner end of one of the shaft members.

Fig. 6 is a perspective view of the split ring which engages the pins of the yoke bar and the pins of one of the forks.

Fig. 7 is a perspective view of the fork at the inner end of the second shaft member.

Fig. 8 is a perspective view of the guide pin, which pivotally connects the cups of the guide casings and slides in the yoke bar.

Fig. 9 is a perspective view of one of the guide casings which incase the joint maintaining the proper position of parts, and which contain grease and protect the whole.

This improved universal joint is provided with a yoke bar 1 which is provided with a transversely extending passage 2 for receiving the pivot pin 3, the passage 2 intersecting a longitudinally extending passage or bore 4 in the yoke bar. The pivot pin 3 is provided with an opening 6 which is of the same diameter as bore 4, and it will be seen that when the pivot pin is in place, a clear passage or bore will be provided through the yoke bar 1. This yoke bar 1 is positioned diametrically in the ring 7 which is a split ring having its sections held together by bolts 7'.

This joint is for connecting the two shaft sections 9 and 10 which may be portions of a driving shaft and a driven shaft, or may be short shaft sections which will be in their turn connected with the driving shaft and driven shaft of a machine. Each of these shaft sections is provided with a spherical enlargement 11 forming a fulcrum which will be positioned within the neck extensions 12 and 13 formed upon the guides 14 and 15. These guides 14 and 15 when placed in overlapping relation as shown in Figs. 1, 2 and 3, will form a casing in the form of a sphere, the two cups or sections of the casing being pivotally held together by means of the guide pin 16 which extends through the bore 4 of the yoke bar and opening 6 of the pivot pin 3. The guide pin will therefore serve not only to hold the parts in place, but will serve also as a means to pivotally connect the cups of the casing.

In order to pivotally connect the shaft sections 9 and 10 with the ring and yoke bar the shaft section 9 has been provided with a head 17, and the shaft section 10 with a head 18. The head 17 of shaft section 9 is in the form of a fork provided with arms 19 which terminate in side pins 20 made integral with said arms and fitting into the openings 21 formed in the ring 7. The head 18 of shaft section 10 is in the form of a socket like fork, having arms 23 which extend above and below the yoke bar and are provided with openings 24 to receive the upper and lower end portions of the pivot pin 3. The free end portions of these arms may be connected by a web 25 which serves to strengthen the arms and prevents them from having any tendency toward spreading. It will thus be seen that the elements forming this joint are of a very simple construction, and may not only be produced at a small cost but will be very strong and durable.

When the joint is to be assembled:—yoke 1 is placed in socket 18 and pin 3 inserted, pins 5 of yoke bar and pins 20 of fork 17 are then placed between the two halves of split ring 7 which are now bolted together. The two guide casings 14 and 15 are then slipped over their respective shaft ends till they overlap and pin 16 is run through the holes provided in said casings and through bore 4, thus locking the whole mechanism in one. Collars 26 which are formed of leather, fabric, or other suitable material will then be placed in position and fastened to the neck extensions 12 and 13, and to the shafts by wires or other suitable fasteners to prevent the escape of grease.

It will thus be seen that there has been provided a universal joint which will be strong and durable, very simple in construction, and which will transmit rotation from one shaft to the other with a constant angular velocity ratio.

What is claimed is:

1. A universal joint for transmitting a constant unit angular velocity ratio from a driving shaft to a driven shaft, said joint comprising a shaft section having forks at its inner end, a ring pivotally connected with the forks of said shaft; a second shaft having forks at its inner end portions between the forks of the first shaft, a diametrical yoke pivotally mounted in said ring at right angles to forks of first shaft, a pin pivotally connecting said forks of said second shaft to said yoke, and means for maintaining the ring in proper relational position to the shaft ends at all times.

2. A universal joint comprising a ring having sets of diametrically opposed openings positioned at right angles to each other, a shaft engaging fork extending into said ring and having its arms provided with pins mounted in one set of openings, a yoke extending through the ring at right angles to said fork and having pins mounted in the second set of openings of said ring, the yoke and pins thereof being provided with a longitudinally extending bore and the yoke having a transverse passage intersecting said bore, a shaft engaging socket extending into said ring and having arms embracing said yoke and having openings registering with the transverse passage of said yoke, a pivot pin passing through the registering openings of the yoke and socket with said bore, a pair of casings or guides meeting in overlapping relation, and a pin extending through said bore and having its end portions passing through openings in said guides to pivotally connect them and center said yoke in said casing or guide.

3. A universal joint comprising a ring, a shaft engaging fork extending into and pivotally connected with said ring, a yoke bar extending transversely through the ring at right angles to said fork and rotatably mounted in the ring, a shaft engaging socket having arms extending into said ring and embracing said yoke bar, a pivot pin passing through the yoke bar and socket arms to pivotally mount said socket, a casing or guide having end sections meeting in overlapping relation, and a securing pin extending longitudinally through said yoke and through said pivot pin and having its end portions extending through the overlapping portions of the casing or guide sections to pivotally mount the casing or guide sections and center the yoke bar in said casing.

4. A universal joint comprising a ring, a shaft engaging fork pivotally connected with said ring, a yoke bar rotatably mounted in said ring, a shaft engaging socket extending into said ring, a pivot pin pivotally connecting said socket with said yoke bar, a casing having cup sections meeting in overlapping relation, and a fastener pin for the cup sections passing through the yoke and pivot pin.

5. A universal joint comprising a ring, a yoke bar positioned diametrically in said ring and rotatably mounted therein, a spherical casing or guide positioned about said ring, and having sections positioned in overlapping relation and having neck extensions, shaft sections extending through said neck extensions into said casing and having spherical enlargements in the neck extensions forming fulcrums, a fork at the inner end of one shaft pivotally connected with said ring, a socket at the inner end of the second shaft pivotally connected to said yoke which is positioned at right angles to said fork, and a pin pivotally connecting the sections of the casing and extending through said yoke bar to slidably and pivotally mount the ring and yoke bar.

6. A universal joint comprising a casing or guide having end sections positioned in overlapping relation and having neck extensions, a securing pin pivotally connecting said end sections, shaft sections extending through and fulcrumed in the neck extensions, a yoke bar rotatably and slidably mounted upon said pin, a ring pivotally mounted upon said yoke bar, and heads at the inner ends of the shaft sections having arms pivotally connected with the ring and yoke bar.

In testimony whereof I have hereunto set my hand.

RICHARD H. LOWNDES.